United States Patent
Heck et al.

[11] Patent Number: 5,188,429
[45] Date of Patent: Feb. 23, 1993

[54] FABRICATED WHEEL HAVING A RADIALLY INWARDLY EXTENDING DISC FACE

[75] Inventors: Thomas E. Heck, Monroe; Joseph J. Plaza, Dearborn, both of Mich.

[73] Assignee: Kelsey-Hayes Company, Romulus, Mich.

[21] Appl. No.: 660,464

[22] Filed: Feb. 22, 1991

[51] Int. Cl.⁵ .............................................. B60B 3/14
[52] U.S. Cl. .................. 301/63.1; 301/35.62; 301/64.3; 301/37.1
[58] Field of Search ............... 301/37 R, 37 S, 37 P, 301/37 CM, 62, 63 R, 63 D, 64 SH, 64 SD, 64 R, 65, 105 R, 106, 114, 63 DD, 9 DN

[56] References Cited

U.S. PATENT DOCUMENTS

| | | | |
|---|---|---|---|
| 1,399,410 | 12/1921 | Stafford | 301/9 DN X |
| 1,684,398 | 9/1928 | Johnson | 301/9 DN X |
| 1,815,821 | 7/1931 | Baker | 301/9 DN |
| 1,850,345 | 3/1932 | Eksergian | 301/64 SH X |
| 1,984,169 | 12/1934 | Wyant et al. | 301/6 WB |
| 2,083,325 | 6/1937 | Farr | 301/63 R |
| 2,150,810 | 3/1939 | Slick | 301/62 |
| 2,257,684 | 9/1941 | Hecht | 301/63 R |
| 4,256,347 | 3/1981 | Reppert | 301/64 SH |
| 4,511,183 | 4/1985 | Spiegel et al. | 301/108 R X |
| 4,610,482 | 9/1986 | Overbeck et al. | 301/63 R |
| 4,645,267 | 2/1987 | Weld | 301/37 R |
| 4,659,148 | 4/1987 | Grill | 301/37 CM X |

FOREIGN PATENT DOCUMENTS

| | | |
|---|---|---|
| 2235619 | 1/1974 | Fed. Rep. of Germany ... 301/63 DS |
| 3007911 | 9/1981 | Fed. Rep. of Germany .... 301/37 R |
| 357790 | 10/1931 | United Kingdom . |
| 411636 | 6/1934 | United Kingdom . |
| 453876 | 9/1936 | United Kingdom . |

OTHER PUBLICATIONS

Prior Art Drawings FIGS. A and B illustrating American Racing Equipment of Rancho Dominguez, California, Part No. 72-4604.

*Primary Examiner*—Russell D. Stormer
*Attorney, Agent, or Firm*—MacMillan, Sobanski & Todd

[57] ABSTRACT

A fabricated vehicle wheel wherein a separately formed mounting cup is secured to a back surface of a disc face, and wherein the disc face extends radially inwardly to substantially cover a lug mounting area formed in the mounting cup. The inwardly extending inner face portion is provided with a centrally located access aperture and a plurality of lug access apertures spaced circumferentially around the center access aperture. The lug access apertures are axially aligned with a plurality of lug receiving apertures formed in the mounting cup. A relatively small center cap is removably secured in the centrally located access aperture to provide the fabricated wheel with the appearance of a cast wheel.

6 Claims, 3 Drawing Sheets

FABRICATED WHEEL HAVING A RADIALLY INWARDLY EXTENDING DISC FACE

BACKGROUND OF THE INVENTION

This invention relates in general to a fabricated vehicle wheel and in particular to a fabricated wheel having a separate mounting cup secured to a disc face of the wheel.

Conventional fabricated wheels are typically of two-piece construction and include a center disc and an outer rim. The center disc includes a mounting surface provided with a center pilot hole and a plurality of lug receiving holes for mounting the wheel to an axle of the vehicle. In some instances, a three-piece construction is used, wherein a mounting cup is separately formed and then secured to the center disc. In both constructions, either a full wheel cover, or a smaller hubcap cover for covering only the lug mounting area of the wheel is provided.

Styled fabricated wheel have recently become popular and typically include an outer trim ring and a center hub cover. The region of the center disc between the trim ring and hub cover is painted an appropriate color, usually complementing the color of the vehicle, to complete the styled wheel. Further styling improvements of fabricated wheels include a full face design, wherein the center disc includes a disc face portion which extends radially outwardly to the outer edge of the wheel, thus eliminating the need for the outer trim ring. However, with this design, a center hub cover is still typically required to cover the lug mounting area of the wheel.

SUMMARY OF THE INVENTION

This invention relates to a fabricated vehicle wheel wherein a separately formed mounting cup is secured to a back surface of a disc face, and wherein the disc face extends radially inwardly to substantially cover the lug mounting area formed in the mounting cup. Such a construction, when combined with the full face construction described above, provides the fabricated wheel with the appearance of a cast wheel.

In particular, the wheel includes a rim, a disc face having an outer portion secured to the rim, and a mounting cup secured to a back surface of the disc face. The cup includes a mounting pad having a centrally located pilot aperture and a plurality of lug receiving apertures circumferentially spaced around the pilot aperture. In accordance with this invention, the disc face includes a radially inwardly extending inner portion axially spaced from a front surface of the mounting pad for covering at least a portion of a front face of the mounting pad. Further, the radially inwardly extending inner portion is provided with a centrally located tire mounting equipment access aperture and a plurality of lug mounting access apertures spaced circumferentially around the equipment access aperture. The lug mounting access apertures of the inner portion are axially aligned with the lug receiving apertures formed in the mounting pad. With this design, only a relatively small center cap, which is secured in the equipment mounting access aperture formed in the disc face, is necessary to complete the wheel. This provides the fabricated wheel with an appearance normally only achieved by a decorative cast wheel.

Other features and advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
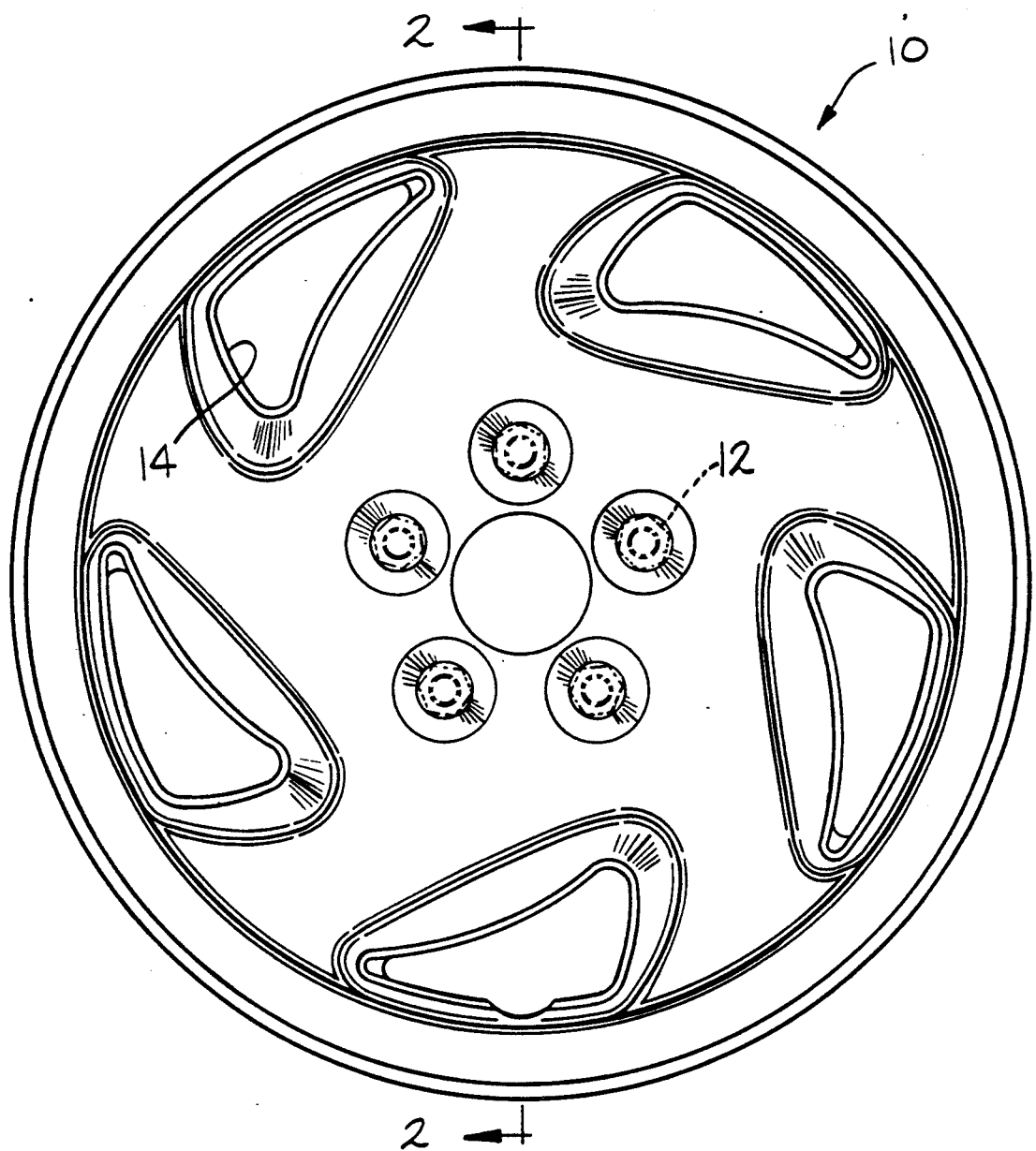
FIG. 1 is a front view of a wheel, constructed in accordance with this invention.

Referring now to the drawings, there is illustrated in FIG. 1 a wheel, indicated generally at 10, constructed in accordance with the present invention. As is well known, the wheel 10 is mounted on an axle (not shown) of a vehicle in a conventional manner, and secured thereto by a plurality of lug nuts 12. The wheel 10 can include a plurality of openings 14 formed therein, having the particular shape shown. However, the openings 14 form no part of the present invention and are merely illustrated to add style to the wheel.

Figure 2:
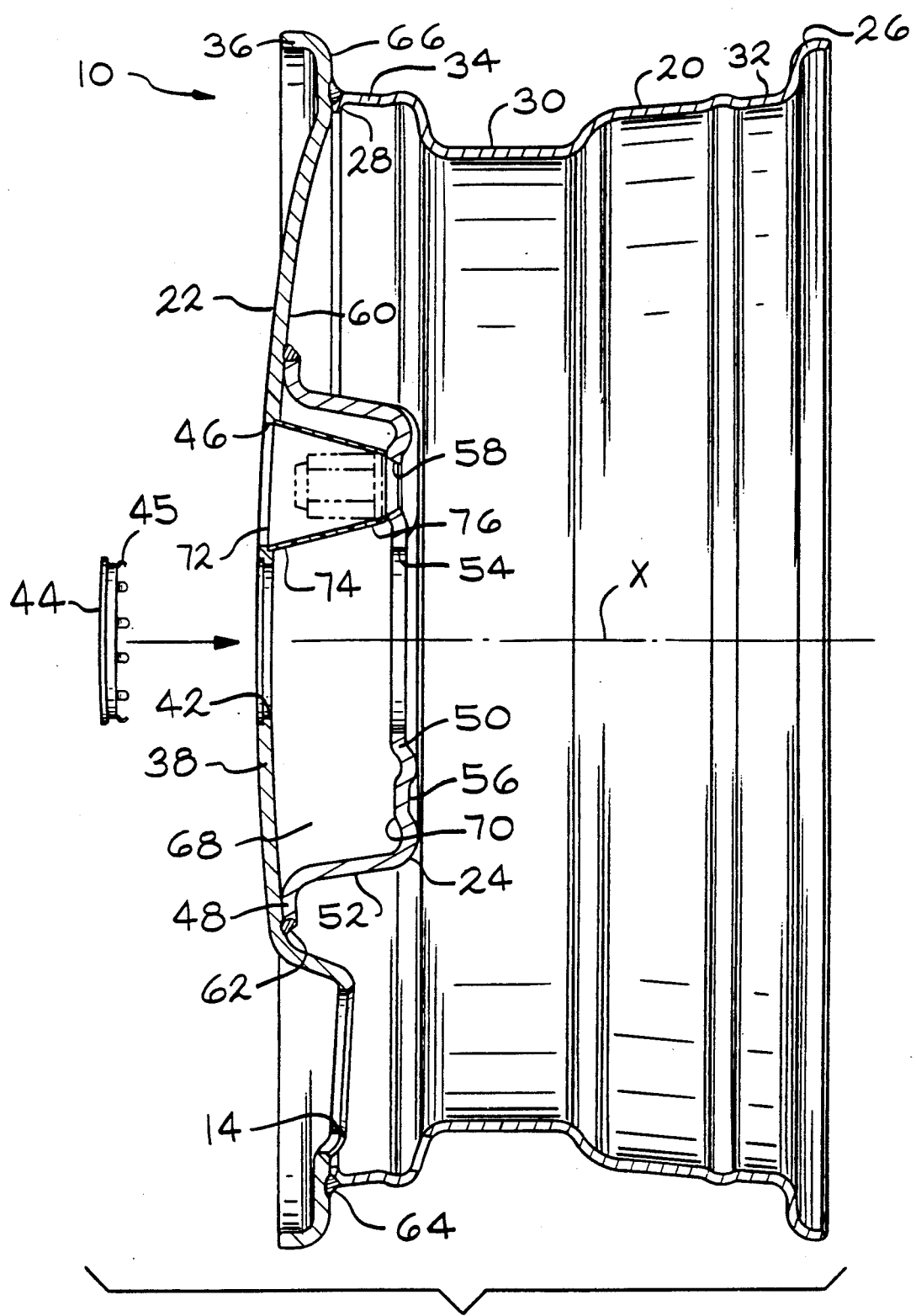
FIG. 2 is a cross-sectional view of the wheel taken along line 2—2 of FIG. 1.

Turning now to FIG. 2, the specific construction of one embodiment of the wheel 10 will be discussed. The wheel 10 is formed by a fabrication operation and is preferably constructed from steel, although other materials, such as aluminum, can be used. The wheel 10 includes a partial rim 20, a disc face 22, and a mounting cup 24. The rim 20 is generally cylindrical in shape having a predetermined rim width, a predetermined rim diameter, and defining a longitudinal axis X. The rim 20 includes an inboard rim flange 26, an outboard rim extension 28, and a intermediate rim well portion 30 interconnecting the rim flange 26 and the extension 28. The inboard rim flange 26 and the rim well portion 30 cooperate to define an inboard tire bead seat 32.

The disc face 22 is generally circular in shape and includes an axially circumferentially extending outer flange portion 36. The mounting cup 24 is generally U-shaped and includes a radially extending outer flange 48 welded at 62 to a back surface 60 of the disc face 22, a radially extending mounting pad 50, and a slightly tapered intermediate portion 52 interconnecting the flange 48 and the mounting pad 50. A centrally located pilot aperture 54 is formed in the mounting pad 50. The pilot aperture 54 allows the wheel 10 to be mounted upon the axle as will be discussed below. The mounting pad 50 further includes a recessed annular portion 56 extending toward the outer flange 48. A plurality of lug receiving apertures 58 are formed in the recessed portion 56 circumferentially spaced around the pilot aperture 54, the aperture 58 defining mounting seats for engaging the associated lug nuts. The number of lug receiving apertures 58 corresponds to the number of lugs (not shown), secured to the vehicle axle upon which the wheel 10 is to be mounted.

In accordance with the present invention, the disc face 22 includes a radially inwardly extending inner face portion 38. A centrally located tire mounting equipment access aperture 42 is formed in the inner face portion 38. The equipment access aperture 42 is provided with a stepped configuration for releasably retaining a relatively small center cap 44. The equipment access aperture 42 allows a tire to be mounted on the rim 20 of the wheel 10 using conventional tire mounting equipment as is well known. Once the tire has been mounted on the wheel, the relatively small center cap 44 can be snapped into the stepped aperture 42. In order to ensure that the cap 44 is secured within the aperture 42, a plurality of retaining tangs 45 can be provided on the periphery of the open end of the cap 44. It should be noted that, in instances when the aperture 42 is not required to accomodate tire mounting equipment, the aperture 42 can be eliminated, such that the inner portion 38 covers the center of the wheel.

Further, a plurality of lug access apertures 46 are formed in the inner face portion 38 and are circumferentially spaced around the equipment access aperture 42. The number of lug access apertures 46 corresponds to the number of lug receiving apertures 58 provided in the mounting pad 50, and are axially aligned therewith. The lug access apertures 46 are formed of a stepped configuration for a purpose to be discussed below, and allow a lug nut wrench (not shown) to be inserted therein and either install or remove the lug nuts 12 from the lugs.

In order to assemble the wheel 10, the mounting cup 24 is located on the back surface 60 of the disc face 22 so that the central apertures 42 and 54, and the plurality of apertures 46 and 58, of the inner face portion 38 and the mounting cup 24, respectively, are axially aligned. The mounting cup 24 is then secured in this position by a weld indicated at 62. Next, the extension 28 of the rim 20 is placed against the back surface 60 of the disc face 22 and secured thereto by a weld indicated at 64. This creates an outboard flange 66 of the wheel 10. The outboard flange 66 and the rim well portion 30 cooperate to define an outboard tire bead seat 34.

The completed wheel 10 forms a pocket 68 between the back surface 60 of the disc face 22 and a front face 70 of the mounting pad 50. In order to prevent dirt, snow, or other similar road debris from entering the pocket 68 through the access apertures 46, a sleeve 72 is provided. The sleeve 72 is generally conical in shape and constructed from a resilient material, such as plastic. The sleeve 72 includes a larger end 74 and a smaller end 76. The larger end 74 of the sleeve 72 is retained by the stepped aperture 46 of the disc 22. The smaller end 76 of the sleeve 72 is supported by the lug nut 12. The sleeve 72 extends completely between the disc face back surface 60 and the mounting pad front face 70 and thus prevents any debris from entering the pocket 68 through the access apertures 46 and accumulating therein. As an alternative to the sleeves, separate snap-in covers, similar in construction to the center cap 44, can be used to cover the apertures 46.

Figure 3:
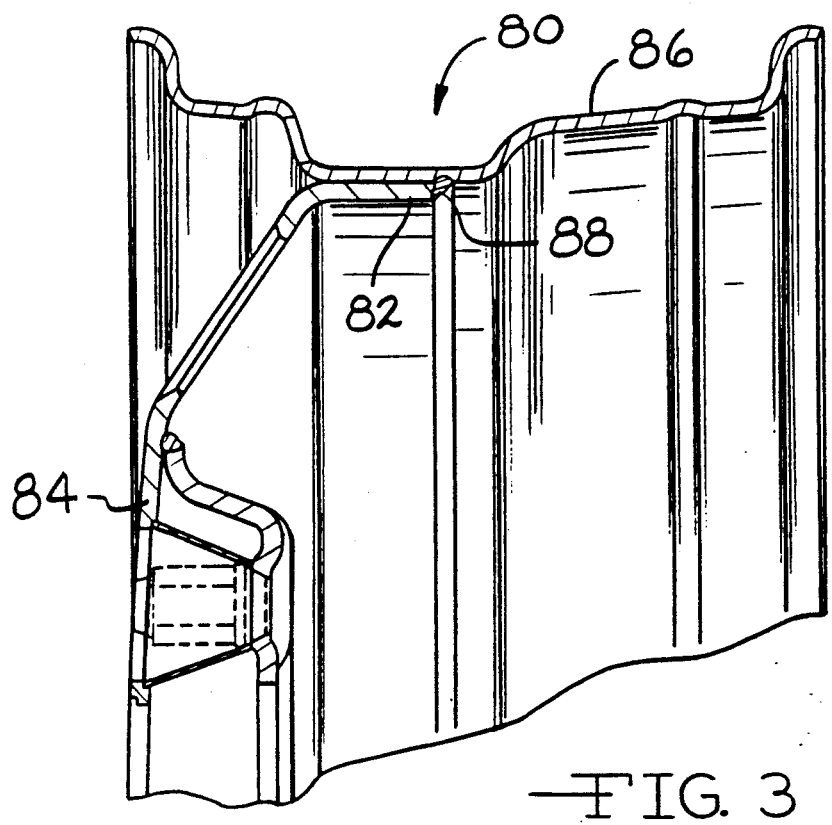
FIG. 3 is a cross-sectional view similar to FIG. 2, and showing an alternate embodiment of the wheel.

Turning now to FIG. 3, an alternate embodiment of the wheel 10 illustrated in FIGS. 1 and 2 will be discussed. FIG. 3 illustrates a three-piece fabricated wheel 80 which is similar to the wheel 10 of FIG. 2, except that an outer flange portion 82 of a disc face 84 is secured to a standard rim 86 by a weld indicated at 88.

Figure 4:
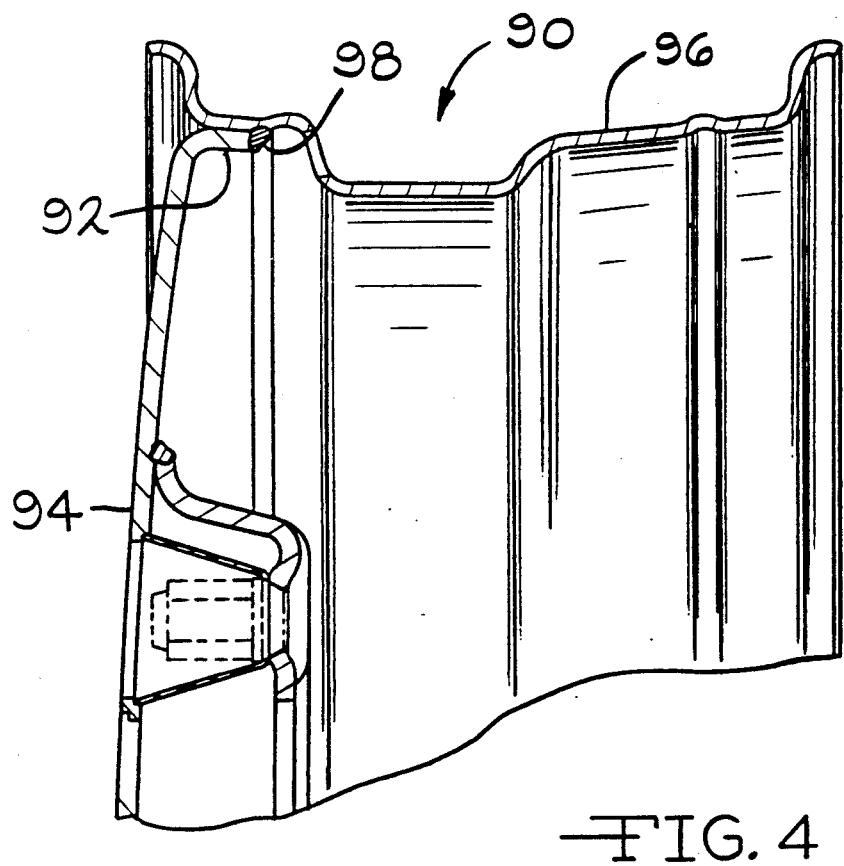
FIG. 4 is a cross-sectional view similar to FIG. 2, and showing a further alternate embodiment of the wheel.

FIG. 4 shows another embodiment of the invention. In this embodiment, a three-piece fabricated wheel 90 is also similar to the wheel 10 of FIG. 2, except that an outer flange portion 92 of a disc face 94 is secured to a standard rim 96 by a weld indicated at 98.

The principles and mode of operation of the invention have been described and illustrated in its preferred embodiments. However, it must be understood that the invention may be practiced otherwise than as specifically explained and illustrated without departing from the scope of the attached claims.

We claim:

1. A wheel for a vehicle comprising:
   a circular rim defining an axis;
   a disc face having an outer portion secured to said rim;
   a mounting pad secured to a back face of said disc face having a centrally located pilot aperture and a plurality of lug receiving apertures circumferentially spaced around said pilot aperture and defining lug nut mounting seats; and
   said disc face including an inner portion extending radially inwardly for at least in part covering a portion of a front face of said mounting pad, said inner portion having a plurality of lug access apertures axially aligned with said lug receiving apertures formed in said mounting pad, the entire portion of said disc face which is located radially inward of said lug access apertures being axially spaced from said front face of said mounting pad.

2. The wheel defined in claim 1 wherein said inner portion of said disc face further includes a centrally located access aperture axially aligned with said centrally located pilot aperture formed in said mounting pad.

3. The wheel defined in claim 2 and further including a cap removably secured in said centrally located access aperture formed in said disc face.

4. The wheel defined in claim 1 and further including a sleeve located between said disc face and said mounting pad and axially aligned with one of said lug receiving apertures and a corresponding one of said lug access apertures.

5. The wheel defined in claim 1 wherein said rim, mounting pad, and disc are formed of steel.

6. The wheel defined in claim 1 wherein said rim is a partial rim defining an inboard tire bead seat, and wherein said outer portion of said disc face cooperates with said partial rim to define an outboard tire bead seat.

* * * * *